(12) United States Patent
Gupta et al.

(10) Patent No.: US 8,787,898 B2
(45) Date of Patent: Jul. 22, 2014

(54) SYSTEM, METHOD AND APPARATUS FOR REMOTELY CONFIGURING SELECTIVE CALL FEATURES

(75) Inventors: Shekhar Gupta, Overland Park, KS (US); Mike A. Roberts, Overland Park, KS (US); Victoria M. Toner, Sheboygan, WI (US); Jim Kevin Edwards, Leawood, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 854 days.

(21) Appl. No.: 12/133,488

(22) Filed: Jun. 5, 2008

(65) Prior Publication Data

US 2009/0305683 A1 Dec. 10, 2009

(51) Int. Cl.
*H04M 3/00* (2006.01)
*H04M 3/42* (2006.01)

(52) U.S. Cl.
USPC .................. 455/419; 455/417; 379/211.02

(58) Field of Classification Search
USPC ......................................................... 455/419
See application file for complete search history.

(56) References Cited

U.S. PATENT DOCUMENTS

| | | | | |
|---|---|---|---|---|
| 6,301,484 B1 * | 10/2001 | Rogers et al. | ................. | 455/466 |
| 2004/0029598 A1 * | 2/2004 | Guggisberg | ................. | 455/466 |
| 2006/0116140 A1 * | 6/2006 | Lee | ................. | 455/466 |
| 2007/0049257 A1 * | 3/2007 | Patel et al. | ................. | 455/414.1 |
| 2007/0127428 A1 * | 6/2007 | Lee et al. | ................. | 370/338 |
| 2007/0135100 A1 * | 6/2007 | Wang | ................. | 455/412.2 |
| 2007/0217593 A1 * | 9/2007 | Pfleging et al. | ................. | 379/211.02 |
| 2008/0175176 A1 * | 7/2008 | George et al. | ................. | 370/310 |
| 2008/0176586 A1 * | 7/2008 | George et al. | ................. | 455/466 |
| 2009/0141881 A1 * | 6/2009 | Lederer et al. | ................. | 379/201.12 |

* cited by examiner

*Primary Examiner* — Lester Kincaid
*Assistant Examiner* — Andy Gu
(74) *Attorney, Agent, or Firm* — Swanson & Bratschun, L.L.C.

(57) ABSTRACT

A method, system and apparatus for remotely configuring selective call features includes receiving a selective call feature request message addressed to a feature configuration address associated with a first communication device from a second communication device. The selective call feature request message includes a selective call feature command. The method further includes enabling a selective call feature indicated by the selective call feature command for the first communication device. In various embodiments, the selective call feature request message is a text message. In some embodiments, the method further includes sending a selective call feature acknowledgment message to the second communication device. The selective call feature acknowledgment message indicates that the selective call feature is enabled for the first communication device. In various embodiments, the selective call feature request message includes a selective call forwarding command, a selective call acceptance command, or a selective call rejection command.

18 Claims, 8 Drawing Sheets

US 8,787,898 B2

SYSTEM, METHOD AND APPARATUS FOR REMOTELY CONFIGURING SELECTIVE CALL FEATURES

BACKGROUND

Often a user wishes to use a selective call feature, such as selective call forwarding, when he or she is away from a home or office telephone. With selective call forwarding, incoming calls to the user's telephone from a selective telephone number are automatically forwarded to another telephone number designated by the user. For example, an employee may wish to have telephone calls from his or her boss forwarded to his mobile telephone while away from the office telephone so that he or she can answer the phone call immediately. However, the employee may wish that calls from those other than the boss ring through to the office telephone so that the caller may leave a voicemail that can be returned at a later time. Typically, before leaving the office, an employee enables selective call forwarding on the office phone and designates the boss' phone number as the calling number and a cell phone as the forwarding number. However, situations may arise in which a user wishes to enable a selective call feature on a telephone, but does not currently have access to the phone.

BRIEF SUMMARY

A method for remotely configuring selective call features includes receiving a selective call feature request message addressed to a feature configuration address associated with a first communication device from a second communication device. The selective call feature request message includes a selective call feature command. The method further includes enabling a selective call feature indicated by the selective call feature command for the first communication device. In various embodiments, the selective call feature request message is a text message. In some embodiments, the method further includes sending a selective call feature acknowledgment message to the second communication device. The selective call feature acknowledgment message indicates that the selective call feature is enabled for the first communication device. In various embodiments, the selective call feature request message includes a selective call forwarding command, a selective call acceptance command, or a selective call rejection command.

An apparatus for remotely configuring selective call features includes at least one processor configured to receive a selective call feature request message addressed to a feature configuration address associated with a first communication device from a second communication device. The selective call feature request message includes a selective call feature command. The at least one processor is further operable to enable a selective call feature indicated by the selective call feature command for the first communication device. In various embodiments, the selective call feature request message is a text message. In some embodiments, the at least one processor is further configured to send a selective call feature acknowledgment message to the second communication device. The selective call feature acknowledgment message indicates that the selective call feature is enabled for the first communication device. In various embodiments, the selective call feature request message includes a selective call forwarding command, a selective call acceptance command, or a selective call rejection command.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
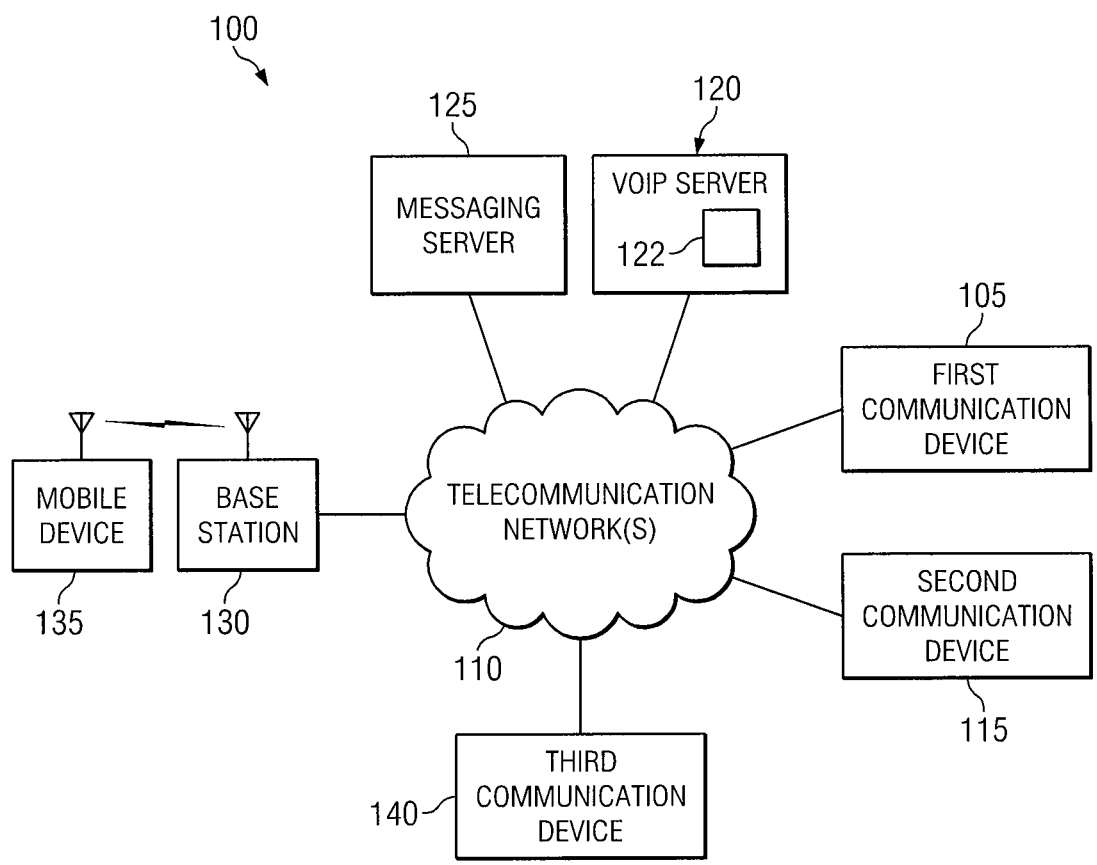
FIG. 1 is an embodiment of an illustrative system for remotely configuring selective call features.

FIG. 1 is an embodiment of an illustrative system for remotely configuring selective call features. The system 100 includes a first communication device 105 in communication with one or more telecommunication networks 110. In at least one embodiment, the first communication device 105 is a Voice over Internet Protocol (VoIP) telephone. The telecommunication network(s) 110 includes one or more communication networks in communication with one another. In at least one embodiment, the telecommunication network(s) includes a combination of wireless networks, landline networks, and the Internet. The system 100 further includes a second communication device 115 in communication with the telecommunication network(s) 110. In at least one embodiment, the second communication device 115 is a telephone. The system 100 further includes a VoIP server 120. The VoIP server 120 is configured to provide VoIP features and capabilities to the first communication device 105. VoIP call features may include initiating and receiving telephone calls, call forwarding, and call rejection. When call forwarding is enabled, any incoming call to the first communication device 105 is automatically forwarded by the VoIP server 120 to a telephone number designated by a user of the first communication device 105. When call rejection is enabled, any incoming call to the first communication device 105 is automatically rejected by the VoIP server 120. During rejection of an incoming call, the incoming call is blocked by the VoIP server 120 and not passed on to the first communication device 105.

In various embodiments, the VoIP server 120 is further configured to provide selective call features associated with the first communication device 105. Examples of selective call features provided by the VoIP server 120 include selective call forwarding, selective call acceptance, and selective call rejection. When selective call forwarding is enabled, incoming calls from one or more selected telephone numbers designated by the user of the first communication 105 in a selective call forwarding list are automatically forwarded by the VoIP server 120 to a telephone number designated by the user of the first communication device 105. Any incoming call from a telephone number not on the selective call forwarding list is passed on to the first communication device 105 by the VoIP server 120. When selective call acceptance is enabled, incoming calls from one or more selected telephone numbers designated by the user of the first communication 105 in a selective call acceptance list are automatically accepted by the first communication device 105. Any incoming call to the first communication device 105 from a telephone number not on the selective call acceptance list is rejected by the VoIP server 120 and not passed on to the first communication device 105. When selective call rejection is enabled, incoming calls from one or more selected telephone numbers designated by the user of the first communication 105 in a selective call rejection list are automatically rejected by the VoIP server 120 and not passed on to the first communication device 105. Any incoming call to the first communication device 105 from a telephone number not on the selective call rejection list is passed on to the first communication device 105. In various embodiments, the VoIP server 120 includes a processor(s) 122 operable to execute computer executable instructions from a computer-usable or computer-readable medium to perform the various capabilities of the VoIP server 120 described herein.

The system 100 further includes a messaging server 125. The messaging server 125 is configured to support the sending of messages, such as text messages, between communication devices and nodes within the telecommunication(s) network 110. In at least one embodiment, the messaging server 125 is a short message service (SMS) server. The system 100 further includes a base station 130 in communication with the telecommunications network 110. The base station 130 is in wireless communication with a mobile device 135. The base station 130 is configured to couple the mobile communication device 135 to the telecommunications network 110. In at least one embodiment, the mobile communication device 135 is a wireless handset. In at least one embodiment, the mobile communication device 135 is configured to support the sending and receiving of text messages, such as SMS messages, within the telecommunication network(s) 110.

The system 100 further includes a third communication device 140 in communication with the telecommunications network 110. In at least one embodiment, the third communication device 140 is a personal computer. In still other embodiments, the third communication device 140 is a wireless communication device. The third communication device 140 is configured to allow access to the VoIP sever 120 by a user to facilitate configuration and management of selective call features or services associated with the first communication device 105. In at least one embodiment, the third communication device 140 includes a call manager software application configured to communicate with the VoIP server 120 to allow configuration and management of the selective call features associated with the first communication device 105.

In at least one embodiment, the user associated with the first communication device 105 may use the mobile device 135 to send a selective call feature request message to the VoIP server 120. The selective call feature request message is addressed to a feature configuration address associated with the first communication device 105. The selective call feature request message includes a selective call feature command indicating a particular selective call feature that is to be enabled for the first communication device 105. In at least one embodiment, the feature configuration address is a text message phone number associated with the first communication device 105 to which selective call feature request messages are addressed. In a particular embodiment, the feature configuration address is inserted into the "To:" field of a text message.

In various embodiments, the mobile device 135 is authenticated at the VoIP server 120 before the selective call feature request message is sent to the VoIP server 120. In such embodiments, the VoIP server 120 will process selective call feature request messages from the mobile device 135 only upon authentication of the mobile device 135 at the VoIP server. In at least one embodiment, a phone number associated with the mobile device 135 is entered into a memory of the VoIP server 120 by the user (or a service provider operator) to authenticate the mobile device 135 at the VoIP server 120. In still other embodiments, the user of the mobile device 135 may send a message containing a unique pass code to the VoIP server 120 prior to the sending of the selective call feature request message. In response to receiving the unique pass code, the VoIP server 120 authenticates the mobile device 135. In still other embodiments, the user may send the unique pass code to the VoIP server 120 as part of the selective call feature request message in order to authenticate the mobile device 135 at the VoIP server 120 to allow the VOIP server 120 to process the selective call feature request message.

The selective call feature request message may include predefined message fields configured to cause the VoIP server 120 to configure at least one selective call feature associated with the first communication device 105 upon receipt of the message. In at least one embodiment, the selective call feature request message is a text message. As described below, an example syntax of the selective call feature request message includes a command field, one or more distinguishing characters, and one or more selective call feature argument fields. The command field may include a selective call feature command indicating that a particular selective call feature, such as selective call forwarding, selective call rejection or selective call acceptance, is to be configured by the VoIP server 120. The one or more distinguishing characters allow the selective call feature request message to be distinguished from a normal text message by the VoIP server 120. In at least one embodiment, the distinguishing character is an asterisk "*". In still another embodiment, the distinguishing character is a pound character "#". The selective call argument fields include information required to configure the selective call feature associated with the first communication device 105.

An example syntax of a selective call feature request message for enabling selective call forwarding for first communication device 105 is as follows:

SCF * from {phone # of caller} to {forwarding phone #}*
The "SCF" command field indicates that the selective call feature request message is a selective call forwarding command. The "from {phone # of caller}" argument represents the telephone number of an incoming caller to which selective call forwarding is to be applied, and the "to {forwarding phone #}" argument represents the phone number to which calls from the incoming caller are to be forwarded, and the "*" distinguishing characters allow the VoIP server 120 to distinguish the selective call feature request message from a normal text message. Upon receiving the selective call forwarding request message, the VoIP server 120 enables selective call forwarding for first communication device 105 such that an incoming call having a phone number of {phone # of caller} will be directed to a communication device having a phone number of {forwarding phone #}, while incoming calls having other phone numbers will be passed on to the first communication device 105. In some embodiments, multiple phone numbers, each separated by a space, may be included in the {phone # of caller} argument to allow selective call forwarding for calls from more than one phone number.

In an example embodiment of a selective call forwarding request message, if the first communication device 105 has a phone number of "913-555-1111" and has been allocated a feature configuration address of "913-555-1212" by the VoIP server 120, the user 1 sends an SMS message to phone number 913-555-1212 using mobile device 135. The body of the SMS message includes the following text: SCF * from 214-455-5555 to 913-555-5000*. In response to receiving the SMS message, the VoIP server will enable selective call forwarding for the first communication device 105 such that an incoming call from phone number 214-455-5555 to phone number 913-555-1111 is forwarded to phone number 913-555-5000.

An example syntax of a selective call feature request message for disabling selective call forwarding for first communication device 105 is as follows: SCF * inactive *. The "inactive" argument indicates to the VoIP server 120 that selective call forwarding is to be disabled for first communication device 105.

An example syntax of a selective call feature request message for enabling selective call rejection for first communication device 105 is as follows:

SCR * from {phone # of caller}*

The SCR command field indicates that the selective call feature request message is a selective call rejection command. The "from {phone # of caller}" argument represents the telephone number of an incoming caller to which selective call rejection is to be applied, and the "*" distinguishing characters allow the VoIP server 120 to distinguish the selective call feature request message from a normal text message. Upon receiving the selective call rejection request message, the VoIP server 120 enables selective call rejection for first communication device 105 such that an incoming call having a phone number of {phone # of caller} is rejected, while incoming calls having other phone numbers are passed on to the first communication device 105.

An example syntax of a selective call feature request message for disabling selective call rejection for first communication device 105 is as follows: SCR * inactive *. The "inactive" argument indicates to the VoIP server 120 that selective call rejection is to be disabled for first communication device 105.

An example syntax of a selective call feature request message for enabling selective call acceptance for first communication device 105 is as follows:

SCA * from {phone # of caller}*

The SCA command field indicates that the selective call feature request message is a selective call acceptance command. The "from {phone # of caller}" argument represents the telephone number of an incoming caller to which selective call acceptance is to be applied, and the "*" distinguishing characters allow the VoIP server 120 to distinguish the selective call feature request message from a normal text message. Upon receiving the selective call acceptance request message, the VoIP server 120 enables selective call acceptance for first communication device 105 such that an incoming call having a phone number of {phone # of caller} is accepted and passed on to the first communication device 105, while incoming calls having other phone numbers are rejected.

An example syntax of a selective call feature request message for disabling selective call acceptance for first communication device 105 is as follows: SCA * inactive *. The "inactive" argument indicates to the VoIP server 120 that selective call acceptance is to be disabled for first communication device 105.

In still other embodiments, the user associated with the first communication device 105 may use the third communication device 140 to send the text message to the VoIP server 120 to configure the selective call features associated with the first communication device 105. In at least one embodiment, the text message sent from the third communication device 140 is an e-mail. In still other embodiments, the text message sent from the third communication device 140 is an SMS message.

Figure 2:
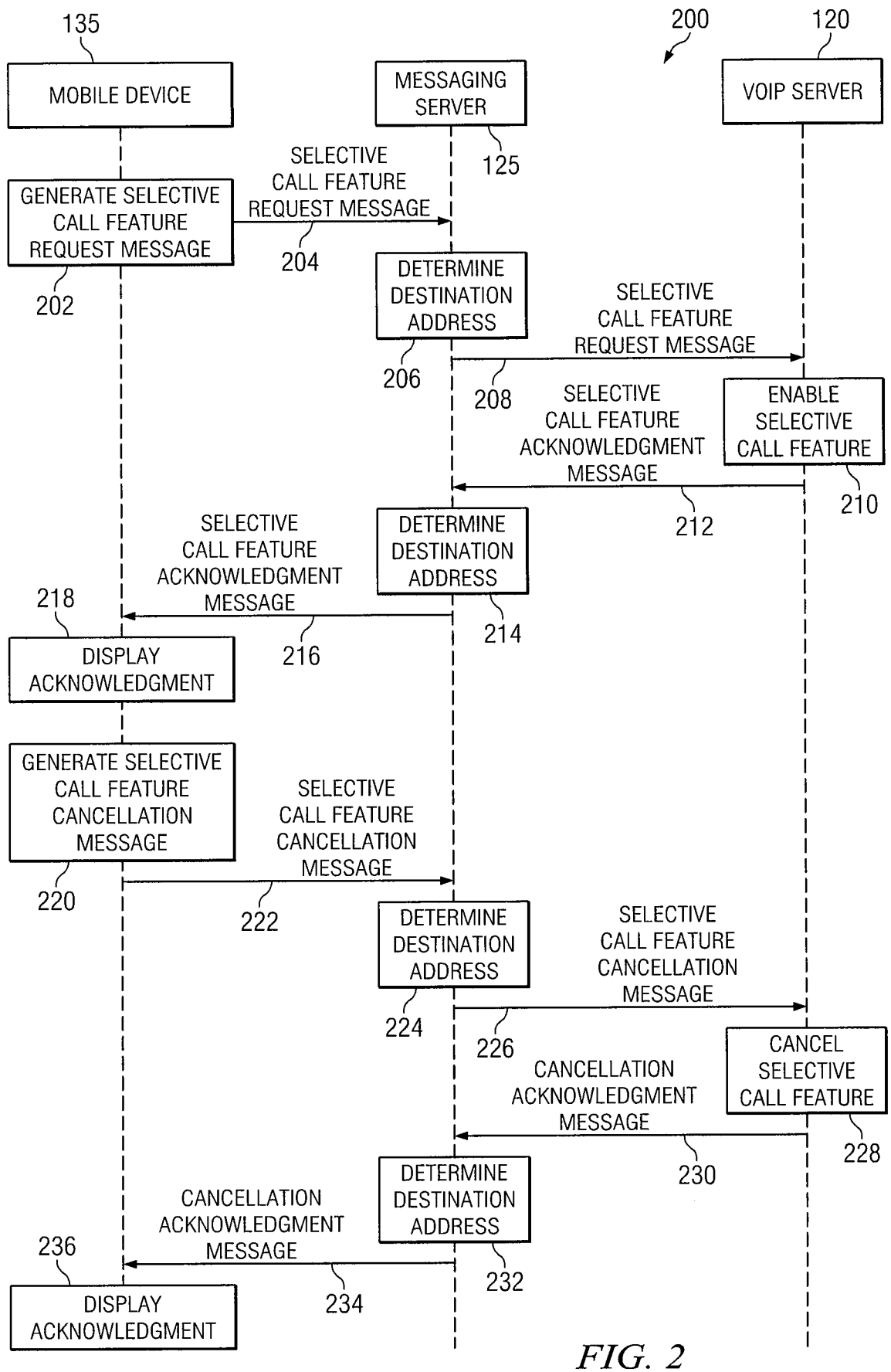
FIG. 2 is an embodiment of an illustrative procedure for remotely configuring selective call features.

FIG. 2 is an embodiment of an illustrative procedure for remotely configuring selective call features. In the embodiment of FIG. 2, a user of the first communication device 105 wishes to configure a selective call feature associated with the first communication device 105. In at least one embodiment, the user is away from the location of the first communication device 105, but has access to the mobile device 135. In step 202, the user generates a selective call feature request message using the mobile device 135. The selective call feature request message is addressed to the feature configuration address associated with the first communication device 105. The selective call feature request message includes a selective call feature command indicating a particular selective call feature that is to be enabled for the first communication device 105. In at least one embodiment, the selective call feature request message is an SMS message. In step 204, the mobile device 135 sends the selective call feature request message addressed to the messaging server 125. In step 206, the messaging server 125 determines the destination address indicated by the feature configuration address in the selective call feature request message and forwards the selective call feature request message to the VoIP server 120.

In step 210, the VoIP server 120 determines that the feature configuration address is associated with first communication device 105 and enables the selective call feature indicated by the selective call feature request message for the first communication device 105. In step 212, the VoIP server 120 sends a selective call feature acknowledgment message addressed to the mobile device 135 to the messaging server 125. In step 214, the messaging server 125 determines the destination address associated with the selective call feature acknowledgment message and forwards the selective call feature acknowledgment message to the mobile device 135 in accordance with the determined destination address. In step 218, the selective call feature acknowledgment message is displayed to the user by the mobile device 135. The selective call feature acknowledgment message indicates to the user that the selective call feature has been enabled for the first communication device 105.

If at a later time the user wishes to cancel the selective call feature acknowledgment message at the VoIP server 120, the user generates a selective call feature cancellation message addressed to the feature configuration address associated with the first communication device 105 using the mobile device 135 in step 220. In step 222, the mobile device 135 sends the selective call feature cancellation message 222 to the messaging server 125. In step 224, the messaging server 125 determines the destination address associated with the selective call feature cancellation message from the feature configuration address and forwards the selective call feature cancellation message to the VoIP server 120 in step 226.

In step 228, the VoIP server 120 cancels the indicated selective call feature associated with the first communication device 105 indicated by the selective call feature cancellation message. In step 230, the VoIP server 120 forwards a cancellation acknowledgment message addressed to the mobile device 135 to the messaging server 125. In step 232, the messaging server 125 determines a destination address associated with the cancellation acknowledgment message. In step 234, the messaging server 125 forwards the cancellation acknowledgment message to the mobile device 135. In step 236, the mobile device 135 displays the cancellation acknowledgment message to the user of the mobile device 135. The selective call feature acknowledgment message indicates to the user that the selective call feature has been disabled for the first communication device 105.

Figure 3:
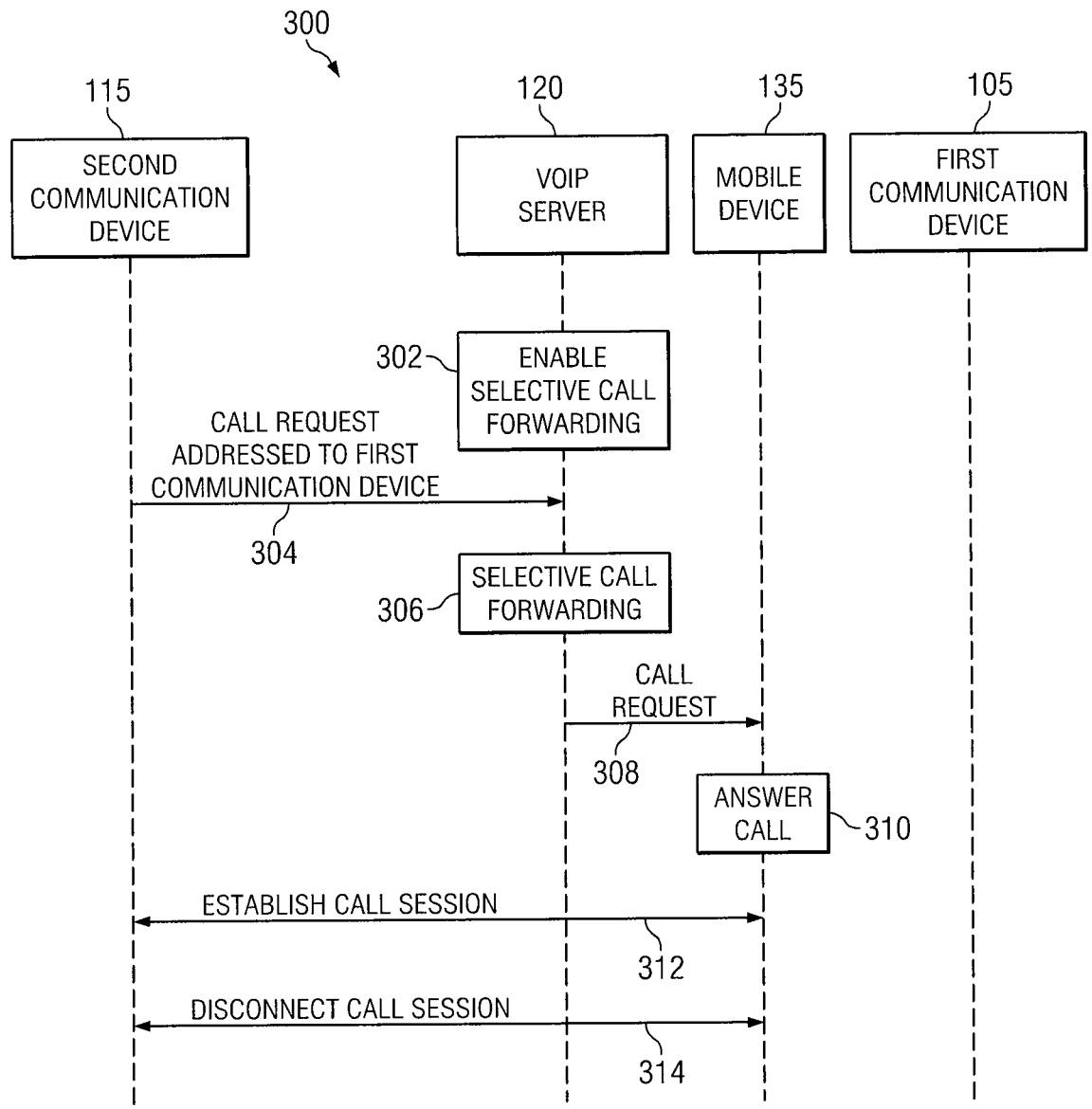
FIG. 3 is an embodiment of an illustrative procedure for selective call forwarding.

FIG. 3 is an embodiment of an illustrative procedure for selective call forwarding. Selective call forwarding allows a user of the first communication device 105 to forward calls associated with a particular phone number to another communication device, such as the mobile device 135, while allowing calls from other telephone numbers to pass to the first communication device 105. The procedure 300 begins in step 302 in which the VoIP server 120 has enabled selective call forwarding for the first communication device 105. In at least one embodiment, the selective call forwarding is enabled by the VoIP server 120 receiving a text message from the mobile device 135 indicating that selective call forwarding should be enabled for the first communication device 105. In step 304, a call request addressed to the first communication device 105 is received from the second communication device 115 by the VoIP server 120. In step 306, the VoIP server 120 uses selective call forwarding to forward the call request to the forwarding phone number indicated by the configuration settings of the VoIP server 120. In step 308, the call request from the second communication device 115 is forwarded to the mobile device 135. In step 310, a user of the mobile device 135 answers the call. In step 312, a call session is established between the second communication device 115 and the mobile device 135. After it is no longer desired to continue the call session, the call session is disconnected in step 314.

Figure 4:
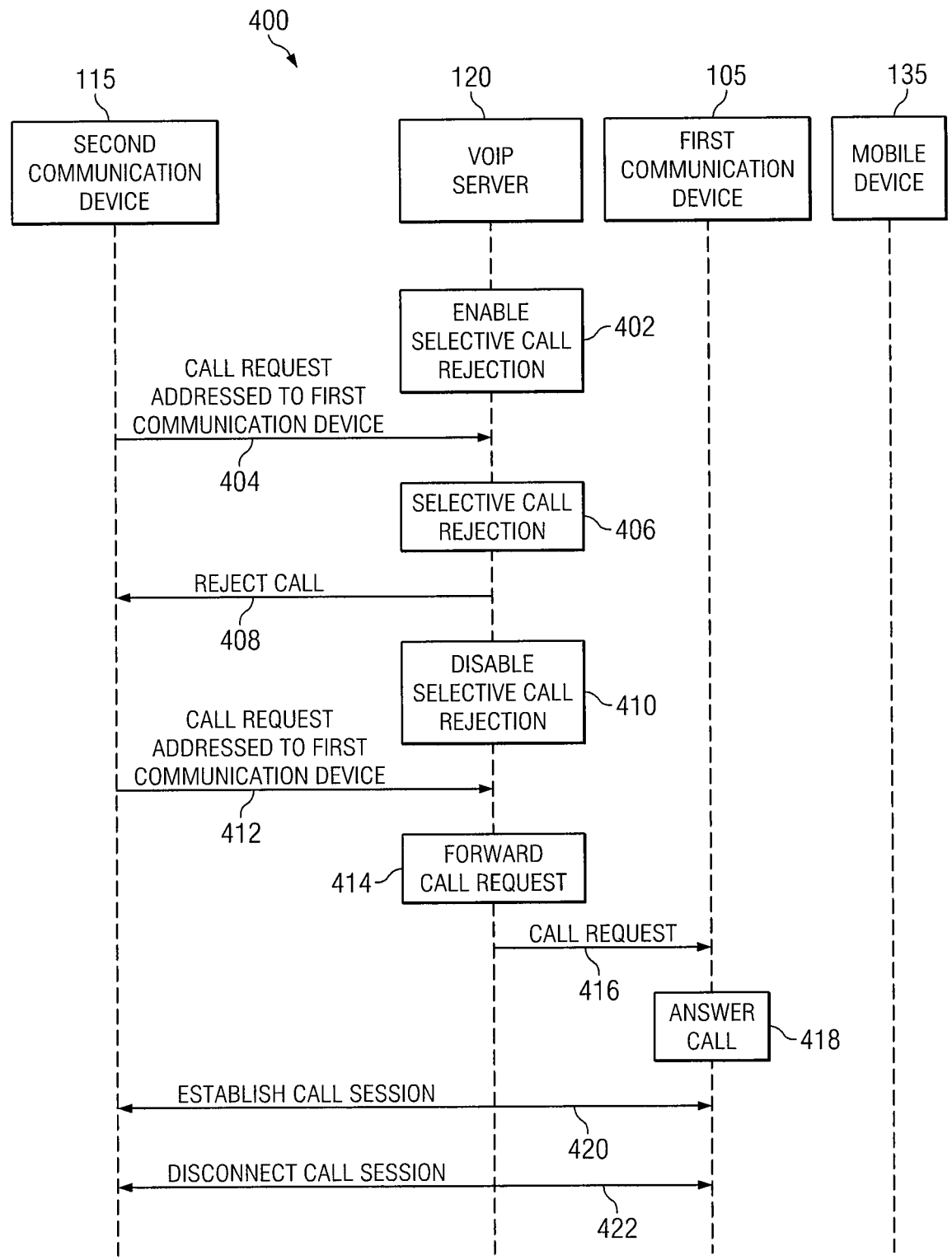
FIG. 4 is an embodiment of an illustrative procedure for selective call rejection.

FIG. 4 is an embodiment of an illustrative procedure for selective call rejection. In such an embodiment, the user of the first communication device 105 wishes to reject calls from the phone number associated with the second communication device 115. The user of the first communication device 105 is presently not located at the location of the first communication device, but has access to mobile device 135. In step 402 of procedure 400, the VoIP server 120 enables selective call rejections for the first communication device 105. In at least one embodiment, a text message is sent from the mobile device 135 to the VoIP server 120 to enable the selective call rejection for the first communication device 105. The selective call rejection rejects any call from the second communication device 115 while allowing calls from other communications devices to pass through to the first communication device 105. In step 404, a call request addressed to the first communication device 105 is received by the VoIP server 120 from the second communication device 115. At step 406, the VoIP server 120 determines that the call request is from a telephone number that should be rejected and performs selective call rejection on the call request. In step 408, the call request is rejected.

At a later time, the user associated with the first communication device 105 may wish to disable selective call rejection. In step 410, the selective call rejection is disabled at the VoIP server 120. In at least one embodiment, the selective call rejection is disabled by the VoIP server 120 receiving a text message from the mobile device 135 indicating that the selective call rejection for the first communication device 105 should be disabled. In step 412, the second communication device 115 sends a call request addressed to the first communication device to the VoIP server 120. Because the selective call rejection feature has been disabled, the VoIP server 120 forwards the call request in step 414.

In step 416, the VoIP server 120 sends the call request to the first communication device 105. In step 418, the user of the first communication device 418 answers the call. In step 420, a call session is established between the first communication device and the second communication device 115. After it is no longer desired to continue the call session, the call session is disconnected in step 422.

Figure 5:
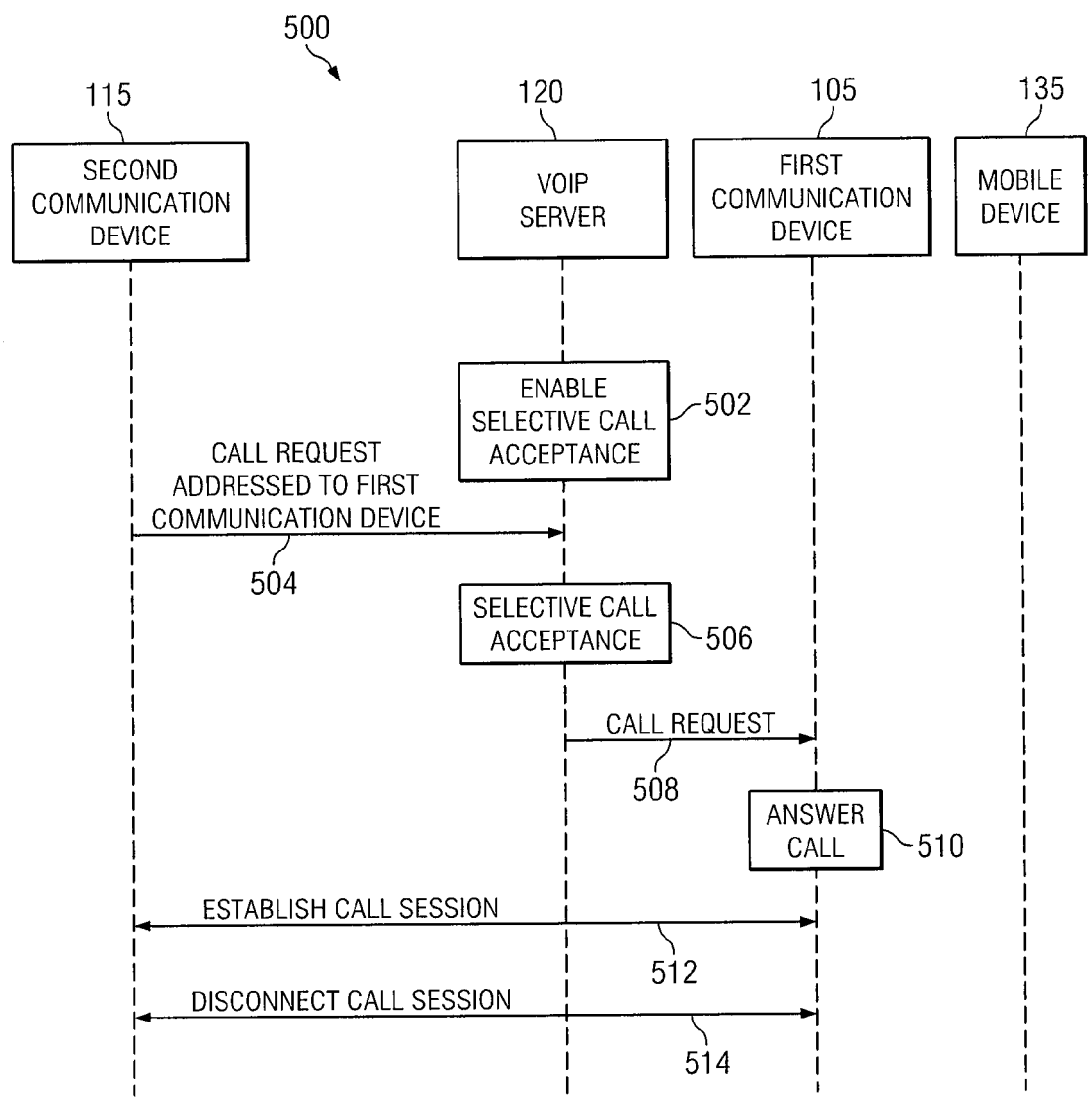
FIG. 5 is an embodiment of an illustrative procedure for selective call acceptance.

FIG. 5 is an embodiment of an illustrative procedure for selective call acceptance. In selective call acceptance, all calls to the first communication device 105 are held except those specifically indicated as being allowed. The procedure 500 begins at step 502 in which VoIP server 120 enables selective call acceptance for the first communication device 105. The selective call acceptance allows the phone number associated with the second communication device 115 to be received by the first communication device 105, but holds all other calls addressed to the first communication device 105. The selective call acceptance may be enabled by the VoIP server 120 in response to receiving a text message from the mobile device 135 indicating that selective call acceptance for the first communication device 105 should be enabled, and that the phone number allowed by the selective call acceptance is that associated with the second communication device 115.

In step 504, a call request addressed to the first communication device is received at the VoIP server 120. In step 506, the VoIP server 120 performs selective call acceptance on the call request to determine that the call is from an accepted phone number. In step 508, the call request is forwarded to the first communication device 105. In step 510, a user of the first communication device 510 answers the call and in step 512, the call session is established between the first communication device 105 and the second communication device 115. After it is no longer desired to participate in the call session, the call session is disconnected in a step 514.

Figure 6:
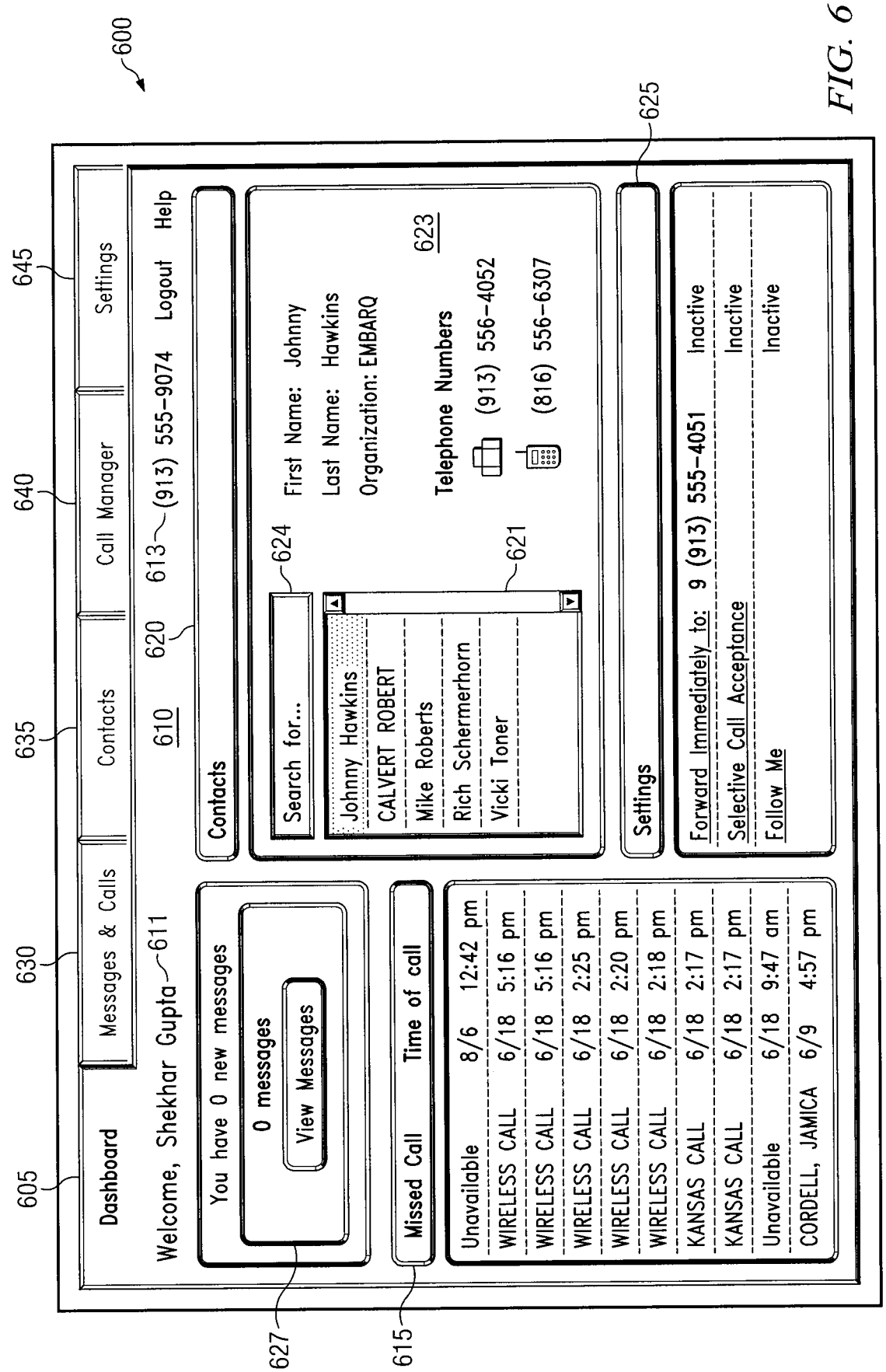
FIG. 6 is an embodiment of an illustrative graphical user interface (GUI) for a call manager software application in which no selective call features have been activated.

FIG. 6 is an embodiment of an illustrative GUI 600 for a call manager software application in which no selective call features have been activated. In accordance with one embodiment, the call manager software application includes software instructions that are executed by a network server, such as VoIP server 120 of FIG. 1, to allow configuration and management of the selective call features associated with the first communication device 105. In at least one embodiment, the GUI 600 is displayed by the third communication device 140 and communicates with the call manager software application at the VoIP server 120. In at least one embodiment, the third communication device 140 communicates with the VoIP server 120 via a web portal. The GUI 600 includes a Dashboard tab 605. The Dashboard tab 605 includes a user identification area 610 identifying the user of the first communication device 105. The user identification area 610 displays a user identification 611 and a telephone number 613 associated with the user. In the particular embodiment illustrated in FIG. 6, the user of the first communication device 105 is identified as "Shekhar Gupta." The Dashboard tab 605 further includes a missed call area 615 that displays a list of missed calls including an identification of the caller and a date and time of the call. The Dashboard tab 610 further includes a contacts area 620 that displays a list 621 of the user's contacts and a contact detail area that displays the first name, last name, organization, and telephone numbers (such as business and mobile phone numbers) of a selected contact. The contacts area 620 further includes a search field 624 that allows the user to search for a particular contact by typing a search term in the search field 624. The Dashboard tab 610 further includes a call feature settings area 625 that displays the status of selective call features, such as selective-call forwarding, selective call acceptance, and selective call rejection, for a selected contract. In the particular embodiment illustrated in FIG. 6, all selective call features are inactive for the selected contact "Johnny Hawkins." The Dashboard tab 610 further includes a message area 627 indicating whether any new messages, such as voicemail messages, have been received by the user.

The GUI 600 further includes a Message & Calls tab 630, a Contacts tab 635, a Call Manager tab 640, and a Settings tab 645. The Message & Calls tab 630, upon selection by the user, gives further information related to the missed calls area 615 and the message area 627. The Contacts tab 635 provides further information related to the contacts area 620, and the Settings tab 645 provides further information related to the call feature settings area 625. The Call Manager tab 640 provides further details about call services, such as selective call services, and call processing rules that are currently configured for the user.

Figure 7:
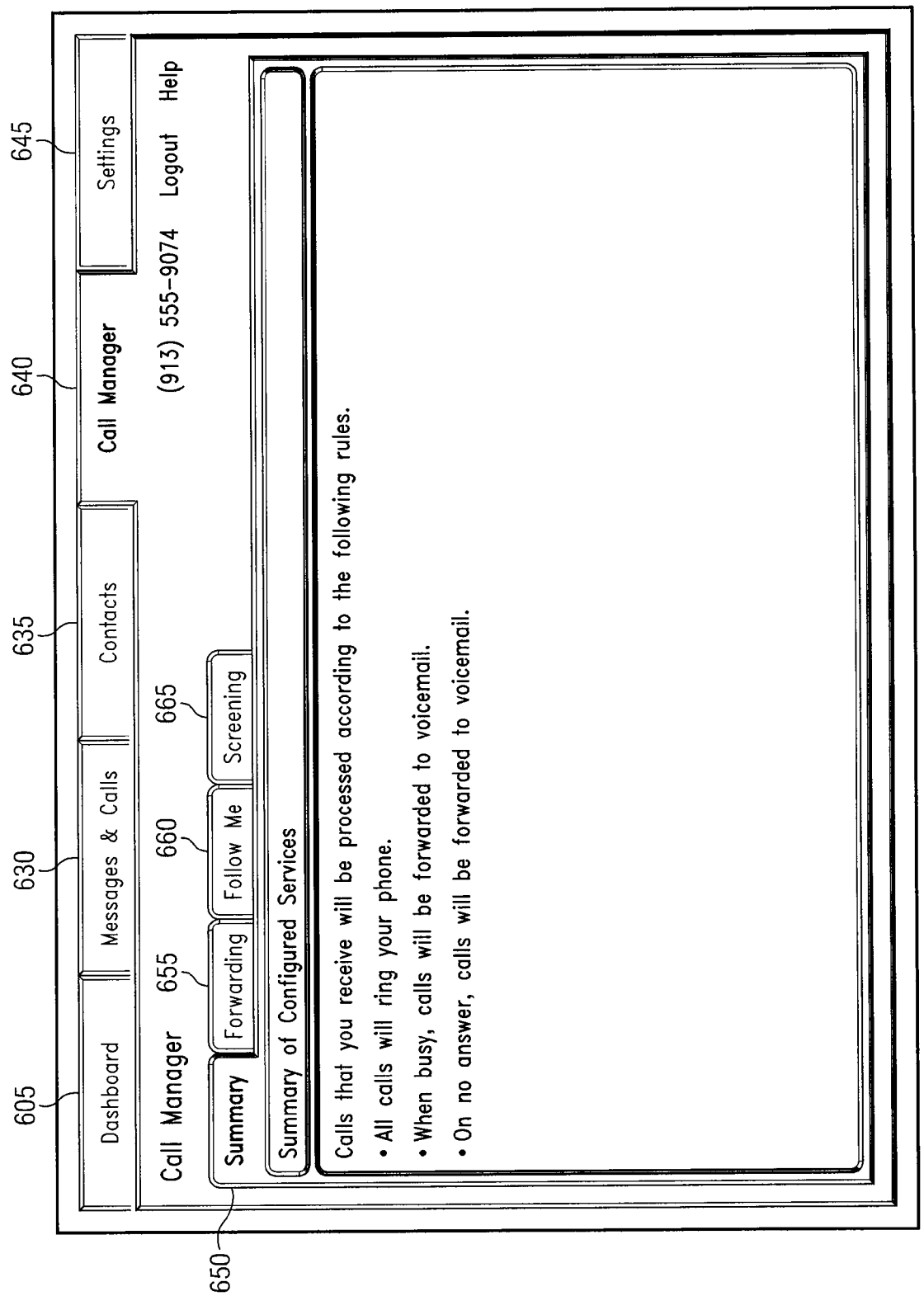
FIG. 7 is an embodiment of an illustrative Call Manager tab of the GUI of FIG. 6.

FIG. 7 is an embodiment of the Call Manager tab 640 of the GUI 600 of FIG. 6. The Call Manager tab 640 includes a Summary tab 650, a forwarding tab 655, a Follow Me 660 tab, and a Screening Tab 665. The Summary tab 650 displays a summary of configured services and call processing rules for first communication device 105. The Forwarding tab 655 displays forwarding information for first communication device 105. The Follow Me tab 660 displays information related to "follow me" rules for first communication device 105. "Follow Me" rules are user-defined rules for treating an incoming call from a particular contact or a group in which that contact is categorized. The Screening tab 660 displays call screening information for the first communication device 105.

Figure 8:
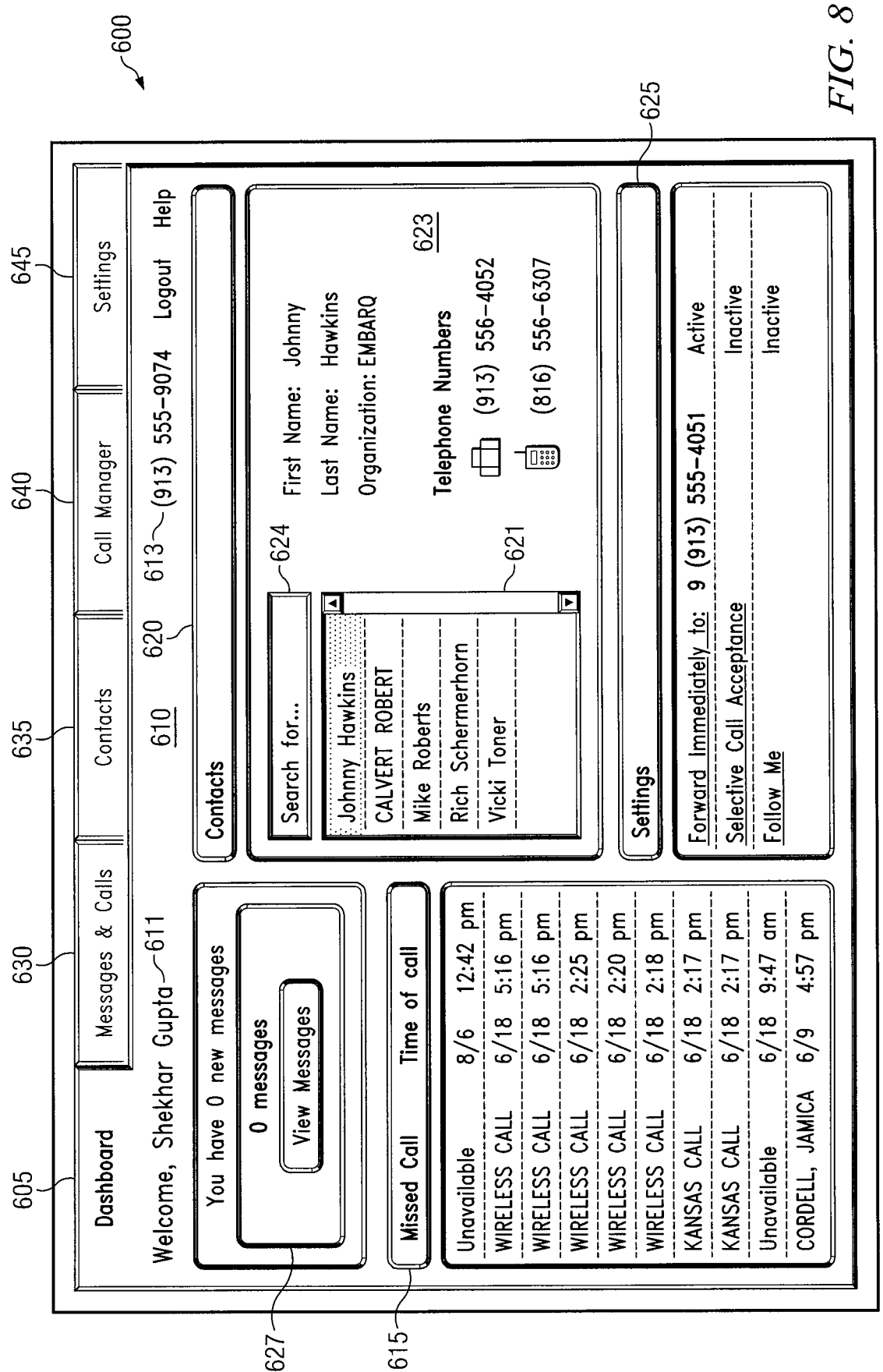
FIG. 8 is an embodiment of the GUI of FIG. 6 in which a selective call feature has been activated.

FIG. 8 is an embodiment of the GUI 600 of FIG. 6 in which a selective call feature has been activated. In the particular embodiment illustrated by FIG. 8, the call feature settings area 625 displays that the selective call feature of selective call forwarding is active for contact "Johnny Hawkins" by the user of first communication device 105 sending a text message including a selective call forwarding command from the mobile device 135. In the particular embodiment illustrated by FIG. 8, when Johhny Hawkins calls user Shekhar Gupta, the call is forwarded by VoIP server 120 to phone number (913)-555-4051 instead of being directed to first communication device 105 having number (913)-555-9074.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus or device.

The computer-usable or computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (RO, a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for remotely configuring selective call features, comprising:
    receiving, by a server, a selective call feature request message addressed to a feature configuration address uniquely allocated only to a first communication device, wherein the feature configuration address is configured to identify the first communication device and wherein the feature configuration address is configured exclusively for receiving selective call feature requests associated with the first communication device, the elective call feature request message including a selective call feature command, wherein a message that includes the selective call feature request message is configured to be distinguished from a normal message that does not include the selective call feature request message based on whether the message includes at least one non-alpha-numerical distinguishing character;
    enabling a selective call feature indicated by the selective call feature command for the first communication device; and
    sending a selective call feature acknowledgment message, the selective call feature acknowledgment message indicating that the selective call feature is enabled for the first communication device.

2. The method of claim 1, wherein the selective call feature request message is a text message, a body of the text message specifying that the selective call feature command, wherein the feature configuration address is inserted into a send to field of the text message.

3. The method of claim 1, wherein the selective call feature acknowledgment message comprises a text message.

4. The method of claim 1, further comprising:
    receiving a selective call feature cancellation message addressed to the feature configuration address associated with the first communication device, the selective call feature cancellation message indicating that a selective call feature is to be disabled; and
    in response to receiving the selective call feature cancellation message, disabling the selective call feature indicated by the selective call feature cancellation message for the first communication device.

5. The method of claim 4, further comprising:
    sending a cancellation acknowledgment message, the cancellation acknowledgment message indicating that the selective call feature is disabled for the first communication device.

6. The method of claim 1, wherein receiving the selective call feature request message includes receiving a selective call forwarding command, a phone number associated with an incoming caller to which selective call forwarding is to be applied, and a phone number to which calls from the incoming caller are to be forwarded.

7. The method of claim 1, wherein receiving the selective call feature request message includes receiving a selective call rejection command and a phone number associated with an incoming caller to which selective call rejection is to be applied.

8. The method of claim 1, wherein receiving the selective call feature request message includes receiving a selective call acceptance command and a phone number associated with an incoming caller to which selective call acceptance is to be applied.

9. The method of claim 1, wherein the at least one non-alphanumerical distinguishing character is located at the end of the call feature request message.

10. An server apparatus for remotely configuring selective call features, comprising: at least one processor, the at least one processor configured to:
   receive a selective call feature request message addressed to a feature configuration address uniquely allocated only to a first communication device, wherein the feature configuration address is configured to identify the first communication device and wherein the feature configuration address is configured exclusively for receiving selective call feature requests associated with the first communication device, the selective call feature request message including a selective call feature command, wherein a message that includes the selective call feature request message is configured to be distinguished from a normal message that does not include the selective call feature request message based on whether the message includes at least one non-alphanumerical distinguishing character;
   enable a selective call feature indicated by the selective call feature command for the first communication device; and
   send a selective call feature acknowledgment message, the selective call feature acknowledgment message indicating that the selective call feature is enabled for the first communication device.

11. The apparatus of claim 10, wherein the selective call feature request message is a text message, and wherein the feature configuration address is inserted into a send to field of the text message.

12. The apparatus of claim 10, wherein the selective call feature acknowledgment message is a text message.

13. The apparatus of claim 10, wherein the at least one processor is further configured to:
   receive a selective call feature cancellation message addressed to the feature configuration address associated with the first communication device, the selective call feature cancellation message indicating that a selective call feature is to be disabled; and
   in response to receiving the selective call feature cancellation message, disable the selective call feature indicated by the selective call feature cancellation message for the first communication device.

14. The apparatus of claim 10, wherein the at least one processor is further configured to:
   send a cancellation acknowledgment message, the cancellation acknowledgment message indicating that the selective call feature is disabled for the first communication device.

15. The apparatus of claim 10, wherein the selective call feature request message includes a selective call forwarding command, a phone number associated with an incoming caller to which selective call forwarding is to be applied, and a phone number to which calls from the incoming caller are to be forwarded.

16. The apparatus of claim 10, wherein the selective call feature request message includes a selective call rejection command and a phone number associated with an incoming caller to which selective call rejection is to be applied.

17. The apparatus of claim 10, wherein the selective call feature request message includes a selective call acceptance command and a phone number associated with an incoming caller to which selective call acceptance is to be applied.

18. The apparatus of claim 10, wherein the at least one non-alphanumerical distinguishing character is located at the end of the selective call feature request message.

* * * * *